April 12, 1966 A. F. WENTWORTH ETAL 3,245,226
APPARATUS FOR QUICK FREEZING SOLID FOODS
Filed April 25, 1963 2 Sheets-Sheet 1

INVENTORS
AMAZIAH F. WENTWORTH
KENNETH M. TUTTLE
BY Wilmer Mechlin
ATTORNEY

April 12, 1966  A. F. WENTWORTH ETAL  3,245,226
APPARATUS FOR QUICK FREEZING SOLID FOODS
Filed April 25, 1963  2 Sheets-Sheet 2

INVENTORS
AMAZIAH F. WENTWORTH
KENNETH M. TUTTLE
BY *Wilmer Mechlin*
ATTORNEY

United States Patent Office 3,245,226
Patented Apr. 12, 1966

3,245,226
APPARATUS FOR QUICK FREEZING SOLID FOODS
Amaziah F. Wentworth, Hotel La Salle, Chicago, Ill., and Kenneth M. Tuttle, 135 Peachtree St., St. Simons Island, Ga.
Filed Apr. 25, 1963, Ser. No. 275,627
13 Claims. (Cl. 62—346)

This invention relates to frozen foods and has for its primary object the provision of improved apparatus for individually quick freezing shrimp and other solid foods.

Another object of the invention is to provide improved apparatus for individually quick freezing foods on an internally refrigerated surface, which is compact, economical in construction and operation and will operate efficiently without insulation or refrigeration of the environment in which it is mounted.

An additional object of the invention is to provide improved apparatus for quick freezing solid foods wherein the foods are frozen on an internally refrigerated surface of a rotary freezing drum and applied thereto by an automatic feed of such construction and arrangement as to present foods individualy to the internally refrigerated surface and apply them to that surface at a substantially uniform pressure sufficient to cause their adherence thereto.

A further object of the invention is to provide in apparatus for quick freezing solid foods in which foods are frozen on an internally refrigerated surface of a rotary freezing drum, an improved feed wherein the foods are applied under pressure to the internally refrigerated surface by resiliently surfaced rotary drum means and are so fed to the drum means as to ensure their individual presentation to the refrigerated surface.

Another object of the invention is to provide apparatus for quick freezing solid foods having a rotary drum on an internally refrigerated surface of which foods are frozen and resiliently surfaced drum means for applying foods to the internally refrigerated surface, wherein the foods are fed to the drum means and carried after freezing from the freezing drum by vibrator conveyors.

Other objects and advantages of the invention will appear hereinafter in the detailed description, be particularly pointed out in the appended claims and be illustrated in the accompanying drawings, in which:

Figure 1:
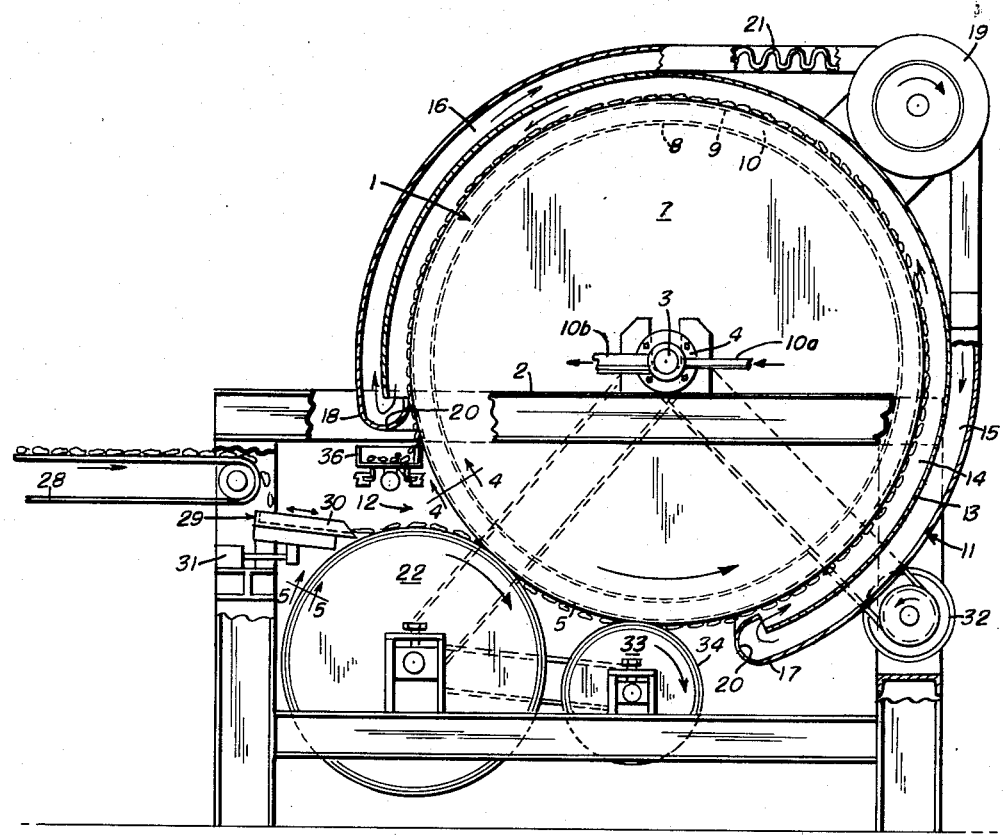
FIGURE 1 is a side elevational view of a preferred embodiment of the quick freezing apparatus of the present invention, with portions broken away and shown in section to more clearly illustrate certain of the details of the construction.
Figure 4:
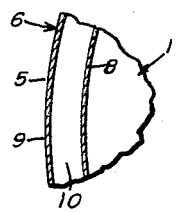
FIGURE 4 is a fragmentary sectional view on an enlarged scale, taken along lines 4—4 of FIGURE 1.
Figure 5:
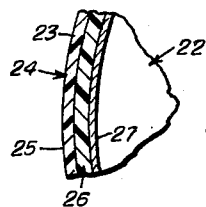
FIGURE 5 is a fragmentary sectional view on the scale of FIGURE 4, taken along lines 5—5 of FIGURE 1.
Figure 6:
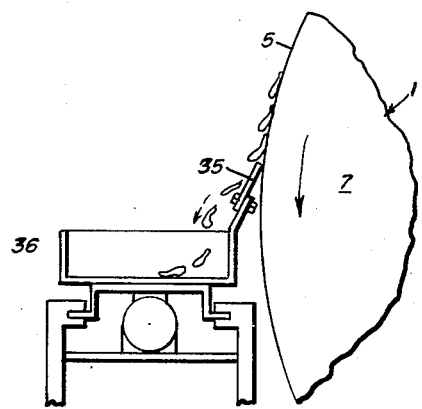
FIGURE 6 is a fragmentary side elevational view on the scale of FIGURE 4 taken from the outlet end of the discharge conveyor.
Figure 2:
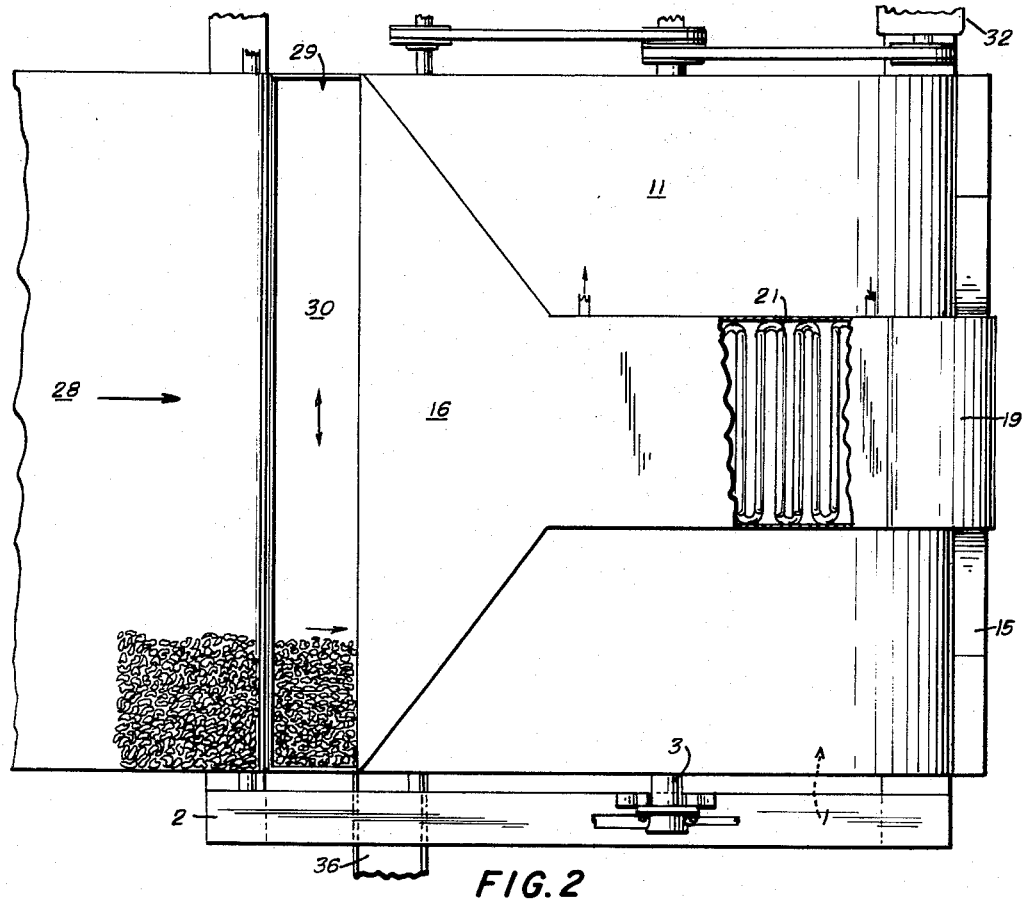
FIGURE 2 is a plan view of the apparatus of FIGURE 1.
Figure 3:
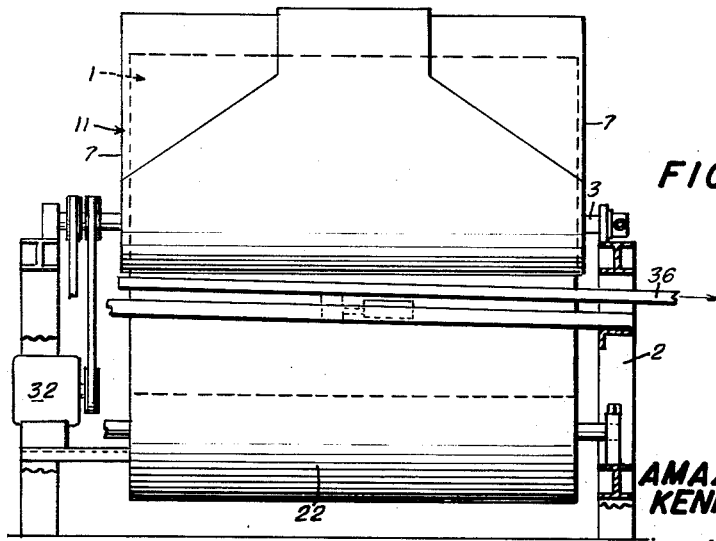
FIGURE 3 is an end elevational view of the apparatus of FIGURE 1, taken from its feed end.

Referring now in detail to the drawings in which like reference characters designate like parts, the improved quick freezing apparatus of the present invention is usable for individually freezing any solid foods, edibles or comestibles, such as shrimp, oysters, scallops and meat patties, which can be caused to bond to and be supported during freezing on an internally refrigerated surface of a rotary freezing drum.

The improved freezing apparatus is comprised of a rotary freezing drum 1 mounted for rotation about a horizontal axis on a suitable stand or supporting frame 2, with the ends of its axle or shaft 3 journaled in bearings 4 secured to the stand. The drum 1 is cylindrical and has a smooth, uninterrupted side or peripheral surface 5, which, in the operation of the apparatus, will usually be maintained by internal refrigeration at a temperature of around —70 to —80° F. To the latter end, the drum conveniently has a double or hollow side wall 6 supported at the ends on spokes or, as illustrated, end discs 7 radiating from the axle 3, and formed of radially spaced, inner and outer side sheets or plates 8 and 9, respectively, at least the outer of which is made of stainless steel or like non-corrosive, thermally conductive material. "Freon 22" or other refrigerant suitable to give desired operating temperature on the side or freezing surface 5, is injected into and expanded in the annular space 10 between the sheets 8 and 9 through a suitable system of coils or passages (not shown) contained in that space in contact with or bounded outwardly by the outer sheet. The refrigerant may be led between a compressor (not shown) and the annular space 10 through inlet liquid and outlet gas lines 10(a) and 10(b), respectively, with suitable fluid swivel connections, such as shown in Carpenter Patent No. 3,020,732, issued February 13, 1962, used in the lines between one or both of the bearings 4 and an adjoining end or ends of the preferred hollow axle 3.

Presented or fed and applied or pressed to the freezing surface 5 in the manner hereinafter to be described, shrimp or other foods are frozen on that surface mainly by transfer of their sensible and latent heats through the surface to the internal refrigerant. However, to freeze foods even more rapidly or quicker than is possible through the internally refrigerated or freezing surface 5, alone, it is desirable to supplement or augment the freezing action of the internal, primary refrigerant by exposing or subjecting the foods during freezing to an externally or separately chilled or refrigerated gas, most conveniently air. Also, to enable the apparatus to operate efficiently without insulation or refrigeration of the environment or space in which it is located, it is desirable that the chilled air, the preferred secondary or supplementary refrigerant, be contained in close proximity to the freezing surface 5 during the period in which the air acts as a heat transfer medium on the foods.

For the foregoing reasons, the drum 1, in the preferred apparatus, is enclosed or contained in a housing or jacket 11 which, if desired, may be externally insulated, the enclosure being complete except or access, preferably, a single access opening 12, onto a side of the drum 1 through which foods are fed for freezing to the internally refrigerated surface 5 and removed therefrom after they have been frozen. Whether or not it is externally insulated, the side wall 13, preferably, closely surrounds or encircles the enclosed portion of the circumference of the drum 1, leaving between itself and the freezing or peripheral surface 5 of the drum an annular air space or freezing chamber of a height or radial dimension sufficient to contain foods on that surface and refrigerated air to supplement the freezing. Instead of being still, the refrigerated air, to increase the effectiveness of its freezing action, is moved or circulated in the freezing chamber 14, either counter or, preferably in the direction of rotation or movement of the drum (counterclockwise, as viewed in FIGURE 1). The refrigerated air not only is moved or impelled within the freezing chamber 14 but, outside of that chamber, preferably is contained by feed and return ducts 15 and 16 leading between the circumferential air inlet and outlet ends 17 and 18, respectively, of the chamber and a squirrel cage or other suitable impeller or blower 19, which with the ducts conveniently may be mounted on the side wall 13 of the housing 11. For directing the refrigerated air to and from the freezing chamber 14, the feed and return ducts 15 and 16 are provided at their drum ends with flow-reversing baffles 20 which are spaced circumferentially beyond and radially overlap the adjoining ends of the side wall 13 of the housing 11.

With the internally refrigerated surface 5 maintained in the operation of the apparatus at a temperature of around —70 to —80° F. by the internal primary refrigerant in the annular space 10 within the drum, the refrigerated air used to augment the freezing action of the primary refrigerant, preferably, is maintained at a temperature below —35° F., the critical temperature below which any moisture contained in or picked up by the air will condense as snow rather than as frost, and readily is so maintained by freezing coils 21 charged with "Freon 22" or like suitable refrigerant located in the return duct 16 adjacent and in advance of the impeller 19.

With the temperature of the air as introduced into the freezing chamber 1 preferably maintained at around —40° F. so as to hold it below the critical temperature in its movement through the freezing chamber 1 and the air moving in a substantially closed circuit or system, the introduction of relatively moist outside or ambient air is minimized and any moisture that may condense from the air in the circuit either on the drum surface 5 or on the freezing coils 21 will be in the form of readily removable snow. Too, the combined freezing action or heat absorption of the internal refrigerant and the air enables foods to be frozen completely in as little as five minutes and, with their exposure to the air so short, the foods in freezing will lose a minimum of moisture to the air by dehydration.

The improved freezing apparatus is capable not only of freezing foods completely in a minimum of time but of continuously feeding the foods to the freezing surface 5. The latter capability is derived from the preferred feeding means which includes, as its means for presenting or feeding and applying or pressing foods to the freezing surface 5, a rotary feed drum 22. Mounted conveniently on the stand 2, for rotation about an axis parallel to that of the freezing drum 1, the feed drum 22 has a cylindrical peripheral or side surface 23 which is resilient so as to compensate for irregularities in the thickness of the foods and distribute the pressure it exerts substantially uniformly among them as it loads them on the freezing surface 5 of the drum 1. In addition to being resilient, the peripheral, feed and applying surface 23 of the feed drum 22 desirably is inert and impervious to or non-hygroscopic or non-absorbent of moisture from the foods upon it. These desired properties are obtained in the preferred embodiment by making the side 24 of the feed drum multi-layered with the outer layer 25 of resilient, nonabsorbent material such as "Teflon," the middle layer 26 of a resilient material such as "Pliofilm" and the inner layer 27 a rigid backing of metal or like material for the other layers.

Foods during freezing are bonded or attached to and held upon the freezing surface 5 on the drum 1 by a bond of frozen moisture obtained or established substantially as they contact the freezing surface by applying them thereto under pressure, using, as the source of the bond, surface moisture either on or applied to the foods before they are fed onto the feed drum 22. For the temperature at which the freezing surface 5 is maintained, a pressure on the order of 70–80 p.s.i. between the two drums will attach the food securely to the freezing surface even though the point of attachment is on the underside of the freezing drum, as in the preferred embodiment in which the access opening 12 is so located as to expose approximately a lower quadrant of the freezing surface. Governed by the resiliency of the feed surface 23 and its radial spacing from the freezing surface 5, the latter as determined by the diameters and radial spacing of the axes of the freezing and feed drums 1 and 22, the applying pressure, for a given spacing, will be substantially uniform over the range of food thicknesses accommodatable in that spacing by the resiliency of the feed surface. If desired, the spacing between the drums can be varied to accommodate foods of different size ranges or change the applying pressure by making the mounting of the feed drum adjustable for changing the radial spacing between the axes of the drums.

The selection of the underside of the freezing surface 5 as the area or quadrant at which foods are applied to it, is especially desirable since there is nothing but friction to hold the foods on the surface of the feed drum 22 and if they are to be prevented from slipping and piling up, their contact with that surface must be limited to its upper or top portion or side. So limited in the portion of the surface 23 of the feed drum 22 by which they are carried or transported and presented and applied to the freezing surface 5 on the drum 1, the foods, if they are to be applied individually to the freezing surface, as is necessary for all to be bonded directly to that surface, must be separated or spread as they are presented to the surface of the feed drum. This separating, spreading or scattering of the foods on the surface 23 of the feed drum 22 is obtainable automatically by feeding the foods toward the drum on a suitable endless conveyor 28 and discharging them from that conveyor downwardly onto a vibrator conveyor 29 having a shelf 30 rimmed or flanged at the front and sides and inclined downwardly toward and opening at the rear onto the upper portion of the surface 23. Conveniently supported on the stand 2 and vibrated at right angles to the feed drum 22 by a suitable vibrator 31, the vibrating shelf or intermediate feed conveyor 30, as well as the endless feed conveyor 28 and the feed drum 22, is of substantially the same width as the freezing drum 1, as are the endless feed conveyor 28 and the feed drum 22.

Synchronized in drive with the freezing drum 1 so as to be driven in the opposite direction and substantially at the same surface speed, conveniently by drivably connecting the drums and using a motor 32 mounted on the stand 2 as the common power source, the feed drum 22, even with the foods spread upon its surface 23 by the vibrator conveyor 29, in the case of some foods, may be incapable, alone, of ensuring that the individual foods are all applied flat upon the freezing surface. Since such flatness of application is desired to obtain maximum contact with the freezing surface and consequent optimum efficiency in freezing through that surface, it is desirable in such cases to use an auxiliary or second feed drum 33 positioned beyond the main feed drum 22 in the direction of rotation of the freezing drum. Rotated parallel to and in the same direction and at the same surface speed as the main feed drum 22 and having a similarly constituted resilient peripheral surface 34, the auxiliary feed drum 33 has its axis so disposed relative to that of the freezing drum 1 for their respective diameters, as to apply substantially the same pressure to foods on the freezing surface 5 as the main feed drum 22. The auxiliary drum 33 may be smaller in diameter than the main feed drum 22 but is of substantially the same width and by pressing the foods a second time against the freezing surface 5, it assures that any foods not flat against and in full contact with that surface, when initially applied by the main drum, will be in such contact as they enter the freezing chamber.

The frozen bond between the foods and the freezing surface 5, because of the extreme cold of that surface, is quite brittle by the time the foods are completely frozen. To detach the frozen foods from the freezing surface 5, it therefore is necessary only that they be tapped or struck by a blunt-edged device disposed in their path as they leave the freezing chamber 14. In the illustrated apparatus this device is a breaker or detaching bar 35 extending across the freezing surface 14 beyond the outlet end 18 of the freezing chamber 14. As they are detached by the breaker bar 35, the frozen foods fall onto a discharge conveyor 36 by which they are conducted away or discharged from the apparatus, usually to or toward a glazing tank (not shown) in which the foods are glazed before being packaged. Although other types may be used, the preferred discharge conveyor 36 is a vibrator conveyor mounted, conveniently on the stand 2, to vibrate parallel to the axis of the freezing drum 1 and flanged or rimmed to close it at the sides and back. Inclined downwardly toward the front, the discharge conveyor 36 at the front will ordinarily extend beyond the adjoining end of the housing 11. Since the direction of movement of the preferred discharge conveyor 36 is parallel to the freezing surface, the breaker bar 35, as desired, may be detachably mounted either on the conveyor or on the stand, in the former case being movable with the conveyor and in the latter stationary.

From the above-detailed description, it will be apparent that there has been provided an improved quick freezing apparatus which is usable for freezing a wide variety of solid foods and particularly lends itself to such wide usage in requiring no special preparation of its environment. It should be understood that the described and disclosed embodiment is merely exemplary of the invention and that all modifications are intended to be included that do not depart from the spirit of the invention or the scope of the appended claims.

Having described my invention, I claim:

1. Apparatus for quick freezing solid foods comprising a rotary freezing drum, an internally refrigerated surface on said drum, resiliently surfaced rotary feed drum means for continuously presenting and applying solid foods individually to said refrigerated surface at a pressure which at the temperature of said surface causes said foods to be bonded individually thereto, means for feeding said foods individually to said feed drum means, and means for detaching said foods after freezing from said surface.

2. Apparatus for quick freezing solid foods comprising a housing, a rotary freezing drum in said housing, an internally refrigerated surface on said drum, a freezing chamber in said housing between a wall thereof and said surface, means for moving a refrigerated gas through said chamber, rotary drum means for continuously presenting and applying solid foods individually to said refrigerated surface at a pressure which at the temperature of said surface causes said foods to be bonded individually therto, and means for detaching said foods after freezing from said surface.

3. Apparatus for quick freezing solid foods comprising a housing, a rotary freezing drum in said housing, an internally refrigerated surface on said drum, a freezing chamber in said housing and bounded inwardly by said surface, duct means connected to opposite ends of and forming with said freezing chamber a substantially closed circuit, means for moving refrigerated air through said circuit, resiliently surfaced feed drum means for continuously presenting and applying solid foods individually to said refrigerated surface at a pressure which at the temperature of said surface causes said foods to be bonded individually thereto, and means for detaching said foods after freezing from said surface.

4. Apparatus for quick freezing solid foods comprising a housing, a rotary freezing drum in said housing, an internally refrigerated surface on said drum, a freezing chamber in said housing and bounded inwardly by said surface, duct means connected to opposite ends of and forming with said freezing chamber a substantially closed circuit, means for moving air through said circuit, means in said circuit for refrigerating said air, resiliently surfaced feed drum means for continuously presenting and applying solid foods individually to said refrigerated surface at a pressure which at the temperature of said surface causes said foods to be bonded individually thereto, and means for detaching said foods after freezing from said surface.

5. Apparatus for quick freezing solid foods comprising a housing, a rotary freezing drum in said housing, an internally refrigerated cylindrical surface on a side of said drum, a freezing chamber in said housing and bounded inwardly by said surface, duct means connected to opposite ends of and forming with said freezing chamber a substantially closed circuit, means for moving air through said circuit, means in said circuit outwardly of said chamber for refrigerating said air, a resiliently surfaced cylindrical feed drum for continuously presenting and applying foods to said internally refrigerated surface at a pressure which at the temperature of said surface will cause said foods to be bonded individually thereto, and means for detaching foods after freezing from said surface.

6. Apparatus for quick freezing solid foods comprising a housing, a rotary freezing drum in said housing, an internally refrigerated cylindrical surface on a side of said drum, a freezing chamber in said housing and bounded inwardly by said surface, duct means connected to opposite ends of and forming with said freezing chamber a substantially closed circuit, means for moving air through said circuit, means in said circuit outwardly of said chamber for refrigerating said air, a resiliently surfaced cylindrical feed drum for continuously presenting and applying foods to said internally refrigerated surface at a pressure which at the temperature of said surface will cause said foods to be bonded individually thereto, a vibrator conveyor for feeding foods individually to said feed drum, and means for detaching foods after freezing from said surface.

7. Apparatus for quick freezing solid foods comprising a housing, a rotary freezing drum in said housing, an internally refrigerated cylindrical surface on a side of said drum, a freezing chamber in said housing and inwardly bounding said surface, duct means connected to opposite ends of and forming with said freezing chamber a substantially closed circuit, means for moving air through said circuit, means in said circuit for refrigerating said air, a main rotary feed drum, a resilient surface on a side of said feed drum for continuously presenting and applying foods to said internally refrigerated surface at a pressure which at the temperature of said last-named surface said foods will be bonded thereto, means for feeding foods individually to said feed drum, a resiliently surfaced auxiliary feed drum disposed beyond said main feed drum for again pressing said foods against said internally refrigerated surface, and means for detaching foods after freezing from said internally refrigerated surface.

8. Apparatus for quick freezing solid foods comprising a rotary freezing drum having an internally refrigerated cylindrical side surface, a feed drum having a resilient cylindrical side surface for presenting and applying foods to said internally refrigerated surface at a pressure at which at the temperature of said last-named surface foods will be bonded individually thereto, conveyor means for feeding foods individually to said feed drum surface, means for detaching foods after freezing from said internally refrigerated surface, and a discharge conveyor disposed to receive said detached frozen foods and discharge them from said apparatus.

9. Apparatus for quick freezing solid foods comprising a rotary freezing drum having an internally refrigerated cylindrical side surface, a feed drum having a resilient cylindrical side surface for presenting and applying foods to said internally refrigerated surface at a pressure at which at the temperature of said last-named surface foods will be bonded individually thereto, conveyor means for feeding foods individually to said feed drum surface, blunt-edged means disposed in the path of foods on said internally refrigerated surface for detaching said foods therefrom after freezing, and conveyor means disposed to receive and discharge said detached frozen foods.

10. Apparatus for quick freezing solid foods comprising a rotary freezing drum having an internally refrigerated cylindrical side surface, a feed drum having a resilient cylindrical side surface for presenting and applying foods to said internally refrigerated surface at a pressure at which at the temperature of said last-named surface foods will be bonded individually thereto, conveyor means for feeding foods individually to said feed drum surface, blunt-edged means disposed in the path of foods on said internally refrigerated surface for detaching said foods therefrom after freezing, and a vibrator conveyor disposed to receive and discharge said detached frozen foods.

11. In apparatus for quick freezing solid foods including a rotary freezing drum having an internally refrigerated cylindrical side surface and means for detaching foods after freezing from said surface, the improvement comprising means for continuously loading foods for freezing on said surface, said loading means including a feed drum having a resilient non-hygroscopic cylindrical side surface for presenting and applying foods to said freezing drum surface at a pressure which at the temperature of said last-named surface will cause said foods to be bonded individually thereto, and a vibrator conveyor for feeding said foods individually onto said feed drum surface.

12. In apparatus for quick freezing solid foods including a rotary freezing drum having an internally refrigerated cylindrical side surface and means for detaching foods after freezing from said surface, the improvement comprising means for continuously loading foods for freezing on said surface, said loading means including a feed drum having a resilient non-hygroscopic cylindrical side surface for presenting and applying foods to said freezing drum surface at a pressure which at the temperature of said last-named surface will cause said foods to be bonded individually thereto, a vibrator conveyor for feeding said foods individually onto said feed drum surface, and an auxiliary drum having a resilient non-hygroscopic cylindrical side surface, said auxiliary drum being disposed beyond said feed drum for re-pressing said foods against said internally refrigerated surface.

13. In apparatus for quick freezing solid foods including a rotary freezing drum having an internally refrigerated cylindrical side surface and means for detaching foods after freezing from said surface, the improvement comprising means for continuously loading foods for freezing on said surface, said loading means including a feed drum having a resilient non-hygroscopic cylindrical side surface for presenting and applying foods to said freezing drum surface at a pressure which at the temperature of said last-named surface will cause said foods to be bonded individually thereto, a vibrator conveyor for feeding said foods individually onto said feed drum surface, conveyor means for feeding said foods to said vibrator conveyor, and an auxiliary feed drum having a resilient non-hygroscopic cylindrical side surface, said auxiliary drum being disposed beyond said feed drum for re-pressing said foods against said internally refrigerated surface.

References Cited by the Examiner
UNITED STATES PATENTS

| | | | |
|---|---|---|---|
| 666,703 | 1/1901 | Seilacher | 62—353 X |
| 1,965,617 | 7/1934 | Vogt | 62—381 X |
| 2,141,462 | 12/1938 | Doering | 62—346 |
| 2,263,972 | 11/1941 | Doering | 62—346 X |
| 2,974,497 | 3/1961 | Carpenter et al. | 62—63 |
| 3,048,987 | 8/1962 | Wentworth | 63—391 X |
| 3,089,316 | 5/1963 | Robbins | 62—346 |

ROBERT A. O'LEARY, *Primary Examiner.*

EDWARD J. MICHAEL, *Examiner.*